March 12, 1940.  K. A. EVELYN  2,193,315

PHOTOELECTRIC COLORIMETER

Filed March 7, 1938    3 Sheets—Sheet 1

INVENTOR
KENNETH A. EVELYN
BY J. D. O'Connell
ATTORNEY

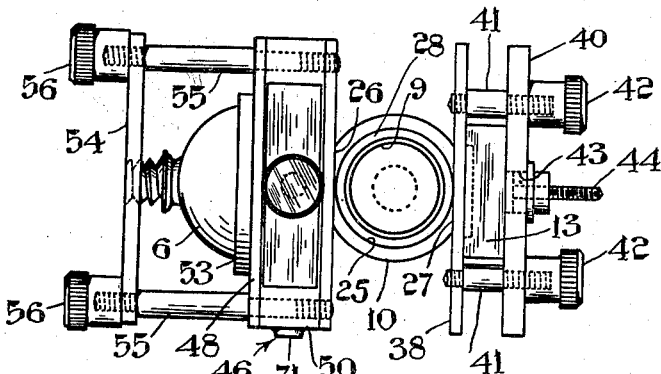
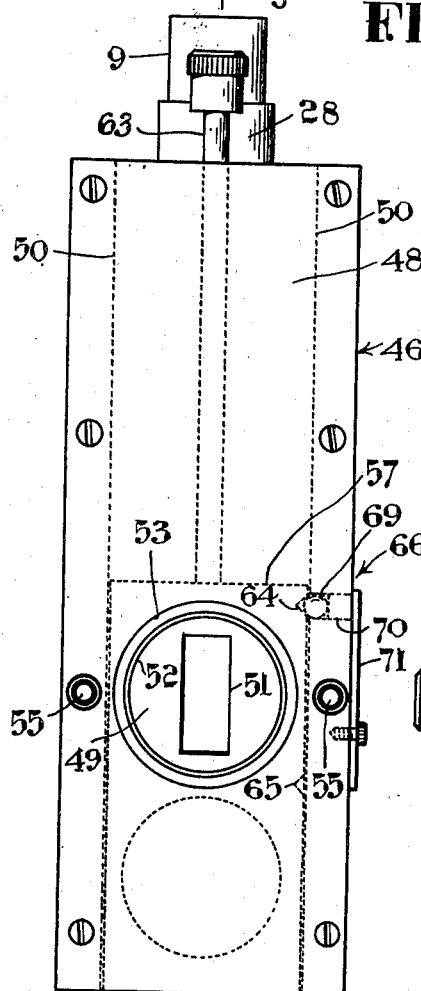
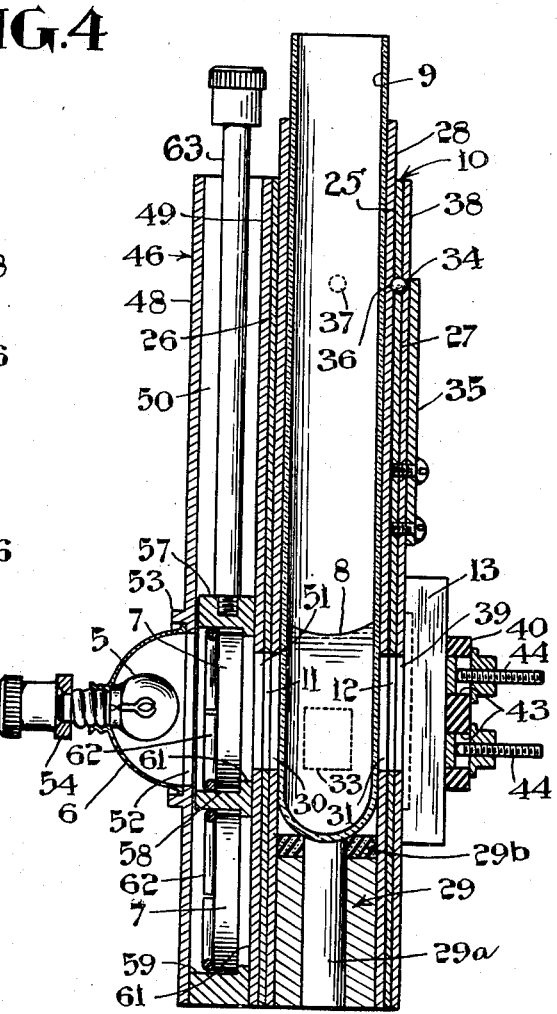

Patented Mar. 12, 1940

2,193,315

UNITED STATES PATENT OFFICE 2,193,315

PHOTOELECTRIC COLORIMETER

Kenneth A. Evelyn, Montreal, Quebec, Canada

Application March 7, 1938, Serial No. 194,368

6 Claims. (Cl. 88—14)

This invention relates to improvements in photoelectric colorimeters for use in biological work and in other relations.

Photoelectric colorimeters for biological work fall into two main classes. The first is the single photocell type in which a solution of the substance under test is placed between the cell and the source of light. The second is the double photocell type in which the substance under test is interposed between the source of light and one of two cells which are balanced against each other in a suitable electrical network.

In the single cell instrument a beam of light falls on a photocell which produces a deflection in a galvanometer to which it is connected. If an absorption cell containing a colored solution is placed between the source of light and the photoelectric cell, the percentage of light transmitted through the solution is proportional to the ratio of the final to the initial galvanometer deflection. The concentration of the colored substance in the sample can then be read from a prepared chart showing the variation of light transmission with concentration. Increased accuracy may be obtained by using color filters which transmit only that portion of the spectrum in which the solution has the correct degree of absorption. It is essential to successful use of this instrument that the source of light be of absolutely constant intensity. Difficulties encountered in meeting this requirement have led to the adoption of the double cell instrument. In the latter both cells are equally affected by changes in the intensity of the light source so that these changes do not affect the galvanometer or other measuring instrument through which the cells are balanced against each other. In the use of the double cell instrument the light absorption of the solution under test is indicated by the extent to which the cells are unbalanced when the test sample is interposed between the light source and one of the cells. The principal difficulty with the double cell instrument is the erratic behaviour which it exhibits as a result of unavoidable asymmetry of the response of the two cells to light of different wave lengths.

In order to obtain the required high degree of precision with either the single or double cell photoelectric colorimeters now available it is usually necessary to interpose some form of adjustable light controlling means, such as an adjustable diaphragm, between the light source and the sample under test in order to compensate for changes in the intensity of the light source or in the current output of the cell or cells. The movable parts thus introduced into the instrument materially increase the possibility of errors due to purely mechanical causes and render the instrument less convenient to operate.

The instrument provided in accordance with the present invention comprises a simple and conveniently operated colorimeter in which the usual causes of unsatisfactory performances are eliminated by complete mechanical rigidity, absence of moving parts, and a large safety factor in all important components. In this instrument complete mechanical rigidity is achieved by rigid attachment of the light source and cell to opposite sides of an absorption tube holder in line with suitable apertures through which the beam of light passes from the light source to the cell. The light source comprises a lamp mounted in a hemispherical reflector rigidly secured to the tube holder. The lamp used is of exceptionally low power requirement and is run so far below its rated voltage that its useful life is equivalent to almost one year of hard service. In practice satisfactory results have been obtained by using a Mazda No. 31 flash-light bulb mounted in a hemispherical matte-surfaced aluminum reflector. This simple arrangement has many important advantages. The power requirement (1 watt) and the current drain (200 milliamperes) are so low that the lamp can be energized by a 6-volt storage battery or by a standard 6-volt voltage regulating transformer. This ensures extreme stability of light intensity over long periods of time. The small current in the lamp also simplifies the problem of controlling the light intensity, since heating effects in rheostats employed in the control circuit are at a minimum. The light intensity can be varied smoothly over a wide range (200 fold) by the use of a comparatively simple control circuit. The smooth control of light intensity over a wide range and the high illuminating efficiency obtained by the use of the reflector permit use of color filters of very high selectivity and thus greatly extend the scope of the apparatus. The color filters are conveniently interposed between the light source and the absorption tube by means of a filter holder or slide inserted in a suitable compartment of the tube holder.

The extreme stability of light intensity which is characteristic of the light source provided in accordance with the present invention renders unnecessary the use of a diaphragm or other adjustable light controlling means between the light source and the absorption tubes.

This invention also contemplates the provision of two sets of carefully chosen filter units from which various combinations may be selected to isolate bands with transmission maxima at intervals of approximately 20 millimicrons throughout the visible spectrum. Each of these composite filters or filter combinations may consist of 2, 3, or more properly selected units mounted in a common holder and has the advantages of being stable and reproducible.

Proceeding now to a more detailed description reference will be had to the accompanying drawings, in which—

Figure 2 is a view showing the tube holder in front elevation with the lamp and reflector removed. In this view the color filter holder and the absorption tube are shown in the positions which they occupy when the instrument is in use.

Figure 3 is a vertical sectional view of the assembly appearing in Figure 2, the plane of the section being substantially along the line 3—3 of Figure 2. In this view the reflector and lamp are shown in place on the tube holder.

Figure 4 is a complete plan view of the assembly appearing in Figure 3.

Figure 1:
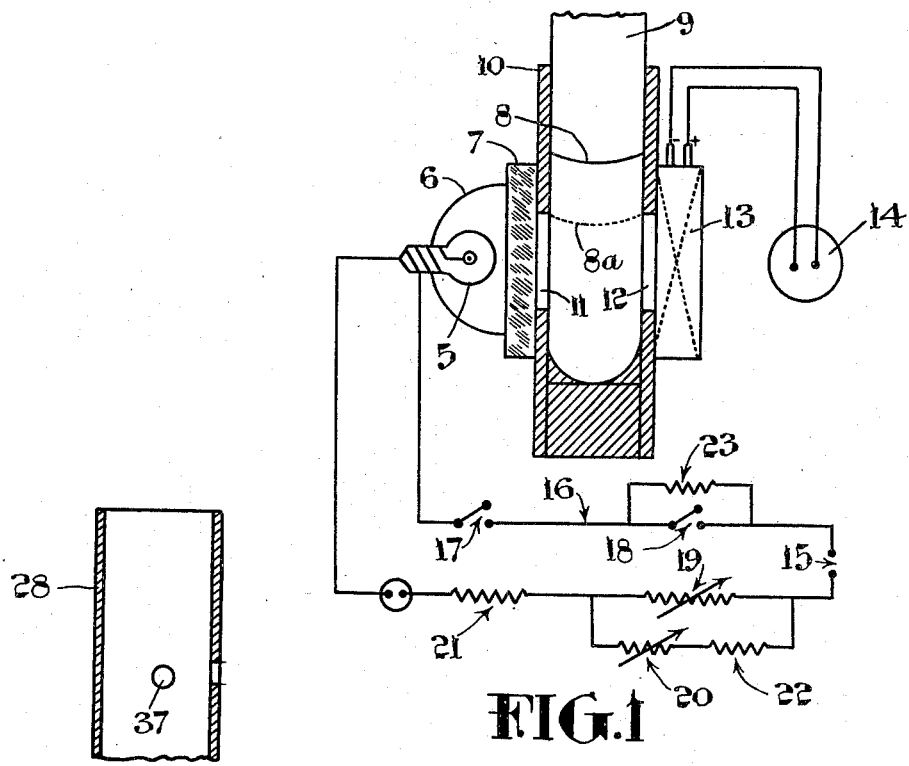
Figure 1 is a schematic view of the essential components of what is now considered to be the preferred embodiment of the invention.
Figure 5:
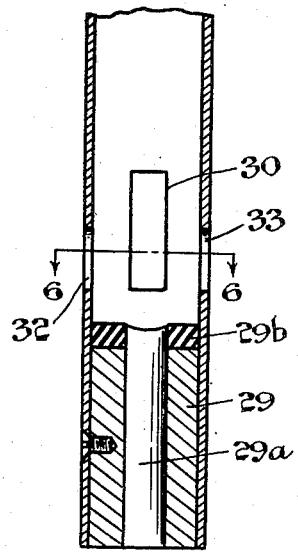
Figure 5 is a side elevation of a tubular liner which is fitted in the absorption tube holder to take the absorption tube.
Figure 6:
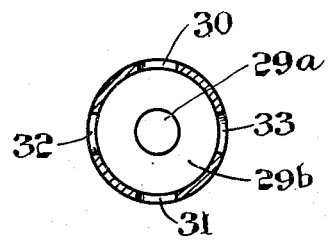
Figure 6 is a transverse section substantially along the line 6—6 of Figure 5.

The general principles of the invention will now be described with reference to Fig. 1. A beam of light from the lamp 5 in reflector 6 passes through the color filter 7 and then through the colored solution 8 contained in the absorption tube 9. The absorption tube is mounted in the tube holder 10 between the rectangular apertures 11 and 12 which serve to define the cross section of the light beam. The transmitted light falls on the photocell 13, the current from which is indicated on the galvanometer 14.

The lamp 5 is preferably a Mazda No. 31, 6.2 volt, flash-light bulb energized by the 6-volt power supply 15 of the simple control circuit 16. The manual controls in this circuit are the main lamp switch 17, the low range lamp switch 18 and the two rheostats 19 and 20. Smooth control of the intensity of the light beam over a wide range is obtained by appropriate adjustment of the rheostats 19 and 20 which provide fine and coarse adjustments, respectively. The rheostats 19 and 20 are connected in parallel with each other but in series with a fixed resister 21 which limits the maximum voltage on the lamp to 5 volts, thus allowing an ample safety factor over the normal operating voltage of the lamp. The rheostat 20 is also connected in series with a fixed resistor 22. The remaining resistor, indicated at 23, is the low range resistor which is cut into or out of the circuit at will by appropriate operation of switch 18. The resistor 21 is not absolutely essential and may be omitted.

In practice I have found that the best results and maximum stability are realized when a 6-volt lead storage battery is used as a power supply for the lamp 5. If this high degree of stability is not required a standard 6-volt voltage regulating transformer may be substituted. Where portability is desired, satisfactory performance can be obtained with a 6-volt dry battery.

The photoelectric cell 13 is connected directly to the galvanometer 14, for which it supplies a suitable external damping resistance. Since heating effects are reduced to a minimum by the small current used in the lamp circuit and since the photocell is exposed to very low intensities of illumination (less than 1-foot candle power) it follows that, in the instrument provided in accordance with the present invention, photoelectric fatigue and temperature effects are negligible. In this connection it may be pointed out that a great deal of the instability of certain photoelectric devices, commonly attributed to "photoelectric fatigue," is really due to heating effects in overloaded lamp circuits.

The galvanometer 14 should have a period of three seconds or less, a coil resistance of about 1000 ohms, and an external critical damping resistance of about 5000 ohms. A full scale deflection of 100 divisions should correspond to a current of about 2.5 microamperes.

The absorption tube 9 is preferably a standard, round bottomed, soft glass test tube. I have found that the substitution of this type of tube for the conventional rectangular glass cell greatly simplifies the operation and construction of the colorimeter. Since many interchangeable tubes are available one may carry out the entire proceeding (except in a few special cases) in the same tube in which the final colorimetric reading is to be made. As the act of making a reading does not in any way interfere with the solution under test serial readings on large numbers of samples may be made as often as desired. This is particularly important in the case of volatile media. The ability to make rapid serial readings on numerous samples is invaluable in the study of the effect on colorimeter reactions of time, temperature, pH, and other variables. Another characteristic feature due to the use of a standard test tube as the absorption cell is that, when a blank tube filled with a colorless solvent is placed in the holder, it acts as a cylindrical lens which concentrates the light beam on the photocell. The galvanometer reading with a blank tube is therefore greater than the corresponding reading with the holder empty. The ratio between the two is about 1.5 and is determined by the geometry of the system, the wave length of the light, and the refractive index of the contents of the tube. Since this ratio is constant for any one type of determination it is immaterial whether the initial deflection is adjusted with the holder empty or with a blank tube (containing solvent only) in place.

The operation of the instrument described herein may be briefly set forth as follows: The proper color filter 7 is selected and interposed between the lamp 5 and the tube 9. A blank tube, containing pure solvent, is inserted in the holder 10 and the rheostats 19 and 20 adjusted until an initial deflection of 100 divisions is obtained. The blank tube is now replaced by the sample tube, the new deflection is noted and the corresponding value of the concentration is obtained from the proper calibration chart.

The preferred mechanical assembly of the absoption tube holder and associated parts to ensure complete mechanical rigidity during the making of determinations is illustrated in Figs. 2 to 5 inclusive. As here shown the holder 10 comprises a metal tube provided with a cylindrical bore 25 and flattened sides 26 and 27. A Bakelite sleeve 28 is removably fitted in the bore 25. The lower end of this sleeve is closed by a plug 29 which supports the rounded bottom of the test tube 9. Apertures 30, 31, 32 and 33 are formed in the lower portion of the sleeve 28. The apertures 30 and 31 are located directly opposite each other and are both of exactly the same size as the apertures 11 and 12 of the holder 10. The apertures 32 and 33, which are also opposed to each other, are located between the apertures 30 and 31 and are somewhat smaller. With the sleeve 28 in the position shown in Fig. 3, the sleeve apertures 30 and 31 are respectively aligned with the apertures 11 and 12 of the holder. In cases where the level of the solution contained in the inserted tube 9 is below the upper edges of the apertures 11 and 12 (see dotted line 8a in Fig. 1) the sleeve 28 is rotated through a suitable angle to position the small apertures 32 and 33 in line with the apertures 11 and 12. The sleeve 28 is held against accidental turning movement in the holder 10 by means of the steel ball 34 and the spring 35 shown in Fig. 3. The ball 34 works in an opening in the holder 10 and is pressed inwardly by the spring 35 to engage in either of the circumferentially spaced recesses 36 and 37 provided in the wall of the sleeve 28. These recesses are arranged so that the ball 34 engages in the recess 36 when the sleeve apertures 30 and 31 are aligned with the apertures 11 and 12 and with the recess 37 when the sleeve apertures 32 and 33 are substituted for the apertures 30 and 31.

A plate 38 is soldered or otherwise secured to the flattened side 27 of the holder 10. This plate is provided with a rectangular aperture 39 matching the aperture 12 of the holder. The photoelectric cell 13 is centered over the aperture 39 and is clamped against the outer surface of plate 38 by a hard rubber strap 40. Strap 40 is fastened to plate 38 by studs 41 and thumb nuts 42 and is provided with suitable apertures 43 for the passage of the cell terminals 44.

A color filter slideway or compartment, generally indicated at 46, is rigidly attached to the side of the holder 10 opposite the photocell 13. The front and rear walls of this slideway or compartment are formed by metal plates 48 and 49, the latter being soldered or otherwise rigidly fastened to the flattened side 26 of the holder 10. The side walls of the filter slideway or compartment are formed by strips 50 which are secured between the longitudinal edges of the plates 48 and 49 by suitable screws or other fastening means.

The rear plate 49 of the filter compartment is provided with a rectangular aperture 51 matching the aperture 11 of the holder 10. The front plate 48 of the filter compartment is provided with a relatively large circular aperture 52 surrounded by an outwardly projecting flange 53. The open side of the reflector 6 is fitted within the flange 53 to bear against the outer surface of the plate 48 as shown to advantage in Fig. 3. The reflector is secured in this position by a clamping strap 54 which bears against the stem of the lamp 5. The ends of the strap 54 are fastened to the filter compartment by means of the posts 55 and the thumb nuts 56.

Single or composite color filters used in accordance with the present invention may be conveniently interposed between the light source and the absorption tube through the agency of a filter slide adapted to be inserted in the filter compartment 46. This slide comprises a plate 57 provided with openings 58 and 59 for the reception of two filters indicated at 7. Each opening is bounded, at one side, by an inwardly projecting ledge 61 against which the filter is clamped by a split retaining spring 62. The plate 57 of the filter slide is moved vertically in the filter compartment by means of the handle rod 63 and is provided with notches 64 and 65 adapted to be selectively engaged by a detent generally indicated at 66. Two filters are mounted in the filter slide so that a change from one type of filter to another may be conveniently made by moving the filter slide up or down in the filter compartment. In using the lower filter the filter slide is moved up to the proper position in which it is secured by engagement of the detent 66 in the notch 65. When the filter slide is moved down to interpose the upper filter between the light source and the absorption tube, it is held against accidental displacement by engagement of the detent 66 in the upper notch 64. As here shown the detent 66 comprises a ball 69 which is forced inwardly through an opening in one side of the filter compartment by a cylindrical member 70 fixed to the upper end of a spring 71.

In the present instance the plug 29 of sleeve 28 is provided with a hard rubber centre 29a whose upper end is surrounded by a soft rubber washer 29b. The rounded bottom of the test tube 9 is supported by the portions 29a and 29b of the plug as shown to advantage in Fig. 3.

Figure 7:
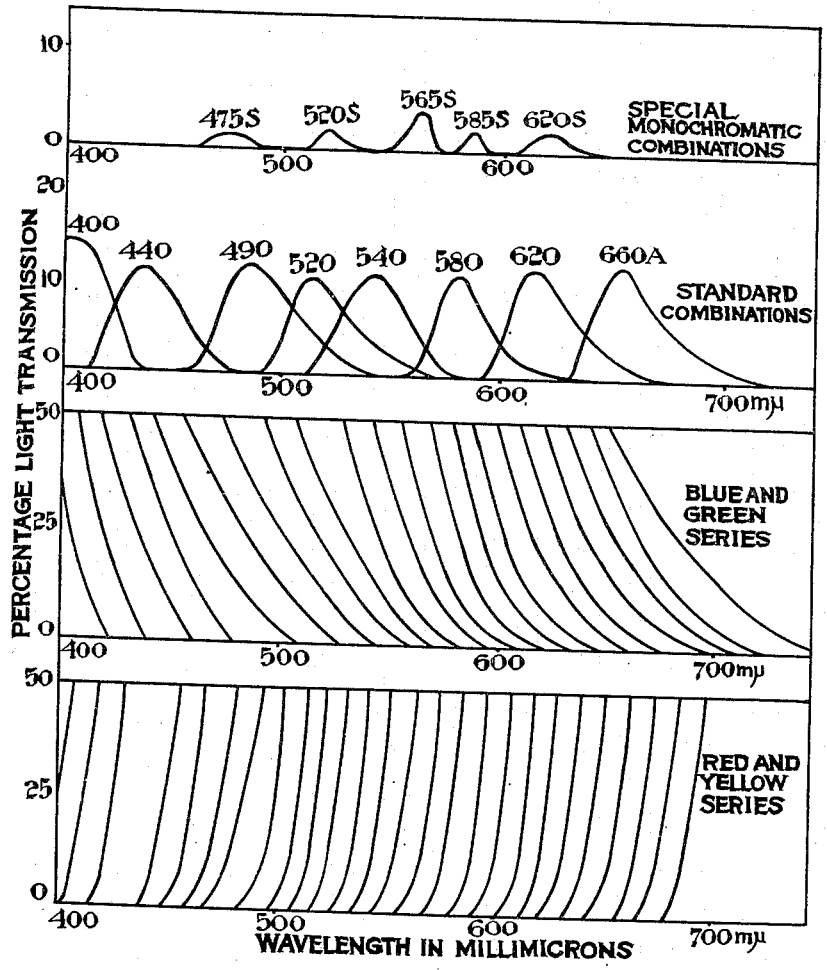
Figure 7 is a curve diagram showing the spectrophotometric curves of a number of composite filters and filter discs which are used in accordance with this invention.

Single or composite filters used with the colorimeter described herein are selected from two sets of unit filters (see Fig. 7) which remove progressively longer and shorter wave lengths respectively so that any desired band may be isolated by selecting a single unit having the required transmission characteristics or by combining appropriate units from each set. The two upper sets of curves shown in Fig. 7 are representative of a few of the composite filters provided in accordance with this invention, while the two lower sets of curves are representative of the characteristics of a number of the component filter discs from which the composite filters are formed. The transmission curves of the unit filters of the two sets should be such that selected units from each set may be combined to provide a series of narrow transmission filter combinations capable of isolating bands with transmission maxima at intervals of approximately 20 millimicrons throughout the visible spectrum. As an illustration of the flexibility of the filter stock, five examples of spectrum transmission filters provided in accordance with this invention are represented in Fig. 7.

To ensure uniformity of filter units of the same type, i. e., duplicate units of either set, they are preferably made from a single melt of glass from which samples have been ground for spectrophotometric standardization. Since slight variations in color density in different parts of the same melt are unavoidable each unit should be checked against a suitable standard to which it must conform.

Having thus described my invention, what I claim is:

1. A photoelectric colorimeter comprising rigidly united cell and filter-slide holders each having, in opposite portions of its wall structure, openings arranged to register with each other and with the openings of the companion holder, a photoelectric cell rigidly secured to the cell holder over the opening therein which is furthest from the filter-slide holder, a reflector rigidly secured to the filter-slide holder over the opening therein which is furthest from the cell holder, an electric light bulb mounted in said reflector in line with said openings, said cell holder being provided between the openings therein with a cylindrical cell receiving bore, a cylindrical lining sleeve rotatably mounted in said bore and provided with two pairs of openings formed in the circumferential wall thereof, said sleeve openings being arranged so that the openings of each pair lie diametrically opposite each other and may be brought opposite the openings in the cell holder by appropriate rotation of the sleeve, the upper edges of one pair of sleeve openings lying in a common horizontal plane located between horizontal planes containing the upper and lower edges of the openings in the cell holder and below a horizontal plane containing the upper edges of the companion pair of sleeve openings; and a cushioning plug closing the lower end of said sleeve and serving as a cushioning support for a cell placed therein.

2. A photoelectric colorimeter as set forth in claim 1 including means for holding the lining sleeve in different positions of adjustment to which it is rotated to bring selected openings of the sleeve in registry with the openings of the cell holder.

3. In a photoelectric colorimeter, a cell holder provided with a cylindrical bore intersecting openings formed in opposite side walls of the holder, a cylindrical lining sleeve rotatably mounted in said bore and provided with two pairs of openings formed in the circumferential wall thereof, said sleeve openings being arranged so that the openings of each pair lie diametrically opposite each other and may be brought opposite the openings in the cell holder by appropriate rotation of the sleeve, the upper edges of one pair of sleeve openings lying in a common horizontal plane located between horizontal planes containing the upper and lower edges of the cell holder openings and below a horizontal plane containing the upper edges of the companion pair of sleeve openings.

4. A photoelectric colorimeter comprising a cell holder provided with a cylindrical bore intersecting openings in opposite side walls of the holder, a filter-slide holder having openings formed in opposite side walls thereof and having one of said side walls rigidly secured to one of the aforesaid side walls of the cell holder so that the openings in the two holders are disposed in alignment, a photoelectric cell rigidly secured to the cell holder over the opening therein which is furthest from the filter-slide holder, a reflector rigidly secured to the filter-slide holder over the opening therein which is furthest from the cell holder, an electric light bulb mounted in said reflector in line with said openings, and a cylindrical lining sleeve rotatably mounted in the cylindrical bore of the cell holder and provided with two pairs of openings formed in the circumferential wall thereof, said openings being arranged so that the openings of each pair lie diametrically opposite each other and may be brought opposite the openings in the cell holder by appropriate rotation of the sleeve, the upper edges of one pair of sleeve openings lying in a common horizontal plane located between horizontal planes containing the upper and lower edges of the openings in the cell holder and below a horizontal plane containing the upper edges of the companion pair of sleeve openings.

5. A photoelectric colorimeter as set forth in claim 4 including a filter-slide mounted in the filter-slide holder and provided with upper and lower filters adapted to be selectively aligned with the openings in said filter-slide holder by sliding movement of the filter-slide relative to the filter-slide holder, said filter-slide and filter-slide holder being provided with cooperating means for retaining the filter-slide against accidental movement when either of the filters is aligned with the openings in the filter-slide holder.

6. In a photoelectric colorimeter, a cell holder provided with a bore intersecting openings formed in opposite walls of the holder, a cylindrical lining sleeve rotatably mounted in said bore and provided with two pairs of openings formed in the circumferential wall thereof, said sleeve openings being arranged so that the openings of each pair lie diametrically opposite each other and may be brought opposite the openings in the cell holder by appropriate rotation of the sleeve, the upper and lower edges of one pair of sleeve openings being co-planar with the upper and lower edges of the openings in the cell holder, the remaining pair of sleeve openings having their lower edges co-planar with the lower edges of the openings in the cell holder but their upper edges located in a lower plane relative to the plane containing the upper edges of the cell holder openings.

KENNETH A. EVELYN.